United States Patent
Shah et al.

(10) Patent No.: US 8,452,693 B2
(45) Date of Patent: May 28, 2013

(54) METHOD FOR PROVIDING GEOGRAPHICAL LOCATION-BASED SECURITY, RESTRICT, PERMIT ACCESS OF VARYING LEVEL TO INDIVIDUAL'S ANY KIND OF DATA, INFORMATION, CREDIT, FINANCES, SERVICES OBTAINED(ONLINE AND OR OFFLINE)

(75) Inventors: Dhavalkumar M Shah, Parlin, NJ (US); Nehal V Mehta, Parlin, NJ (US)

(73) Assignee: Dhavalkumar M. Shah, Parlin, NJ (US)

( * ) Notice: Subject to any disclaimer, the term of this patent is extended or adjusted under 35 U.S.C. 154(b) by 13 days.

(21) Appl. No.: 13/267,114

(22) Filed: Oct. 6, 2011

(65) Prior Publication Data

US 2013/0091042 A1    Apr. 11, 2013

(51) Int. Cl.
    *G06Q 40/00* (2012.01)
(52) U.S. Cl.
    USPC ............................................................ 705/37
(58) Field of Classification Search
    CPC ................................. G06F 17/60; G06F 21/24
    USPC .................................. 705/35, 39; 726/27, 28
    See application file for complete search history.

(56) References Cited

U.S. PATENT DOCUMENTS

| 2002/0152158 A1* | 10/2002 | Paleiov et al. ................... 705/39 |
| 2007/0101438 A1* | 5/2007 | Govindarajan .................. 726/27 |
| 2009/0045251 A1* | 2/2009 | Jaiswal et al. ................. 235/379 |
| 2011/0191862 A1* | 8/2011 | Mandava et al. ................ 726/28 |

FOREIGN PATENT DOCUMENTS

NL    EP 2 093 966    *    2/2008

OTHER PUBLICATIONS

Ardanga et al.: Supporting Lacation-Based Conditions in Access Control Policies, Mar. 21-24, 2006, ASIACCS'06,Taipei, Taiwan, pp. 1-11.*
Shackleford, D.: Smart Strategies for Securing Extranet Access, Mar. 2010, A SANS Whitepaper, pp. 1-17.*

* cited by examiner

*Primary Examiner* — Bijendra K Shrestha
(74) *Attorney, Agent, or Firm* — Dhavalkumar M. Shah

(57) ABSTRACT

Proposed method and security system provide geographical location-based security with varying levels of access. It allows users to select entities to protect, configure geographical locations, geographical boundaries as well as permissions, access level for given geographical locations, geographical boundaries and configure security alerts. It takes decision to grant, deny permission or provide given access level based on user's current geographical location and user's own configuration for that geographical location or boundary and sends out security alerts.

8 Claims, 7 Drawing Sheets

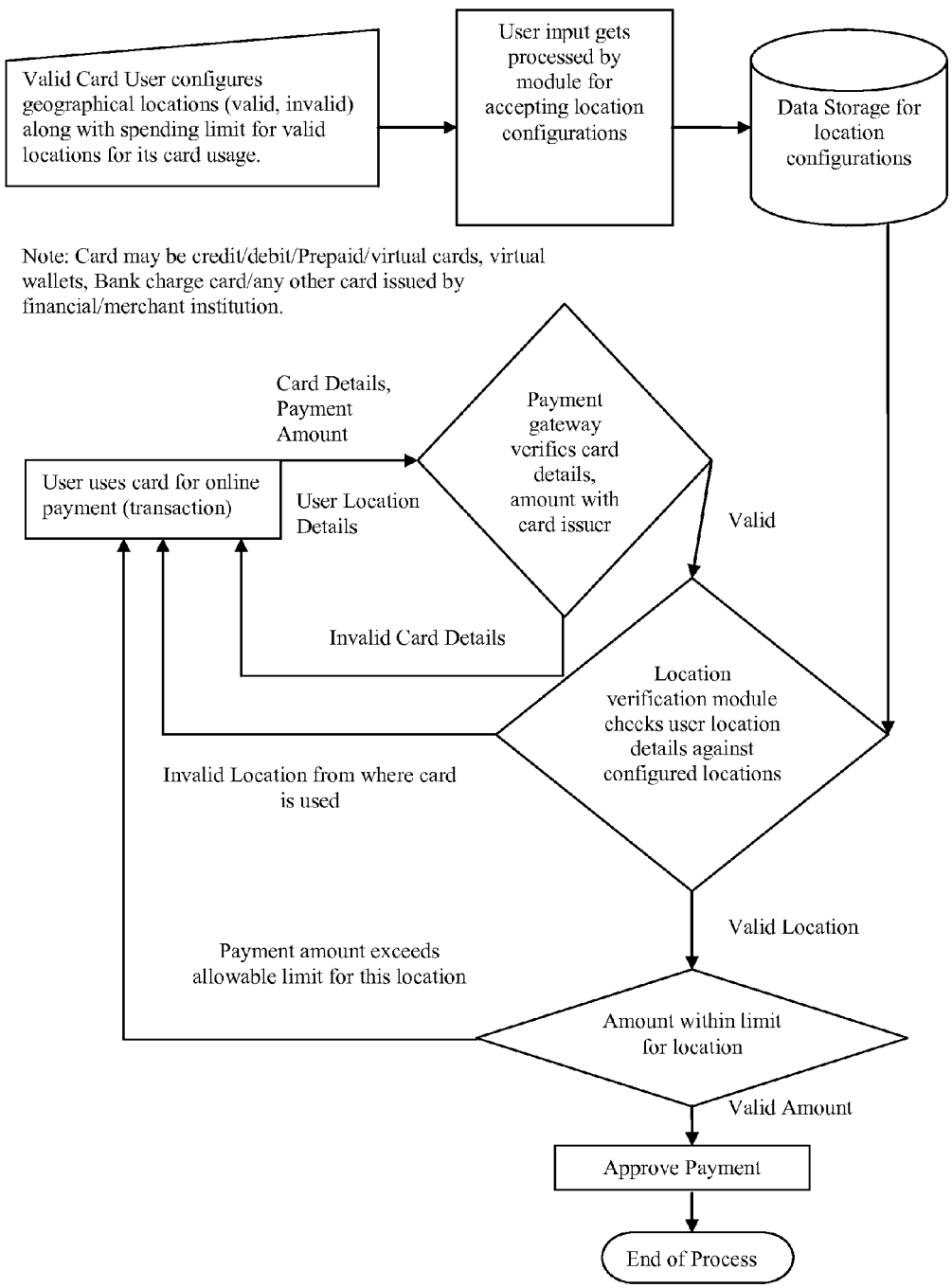
Figure 1: Location based security for online payments (transactions)

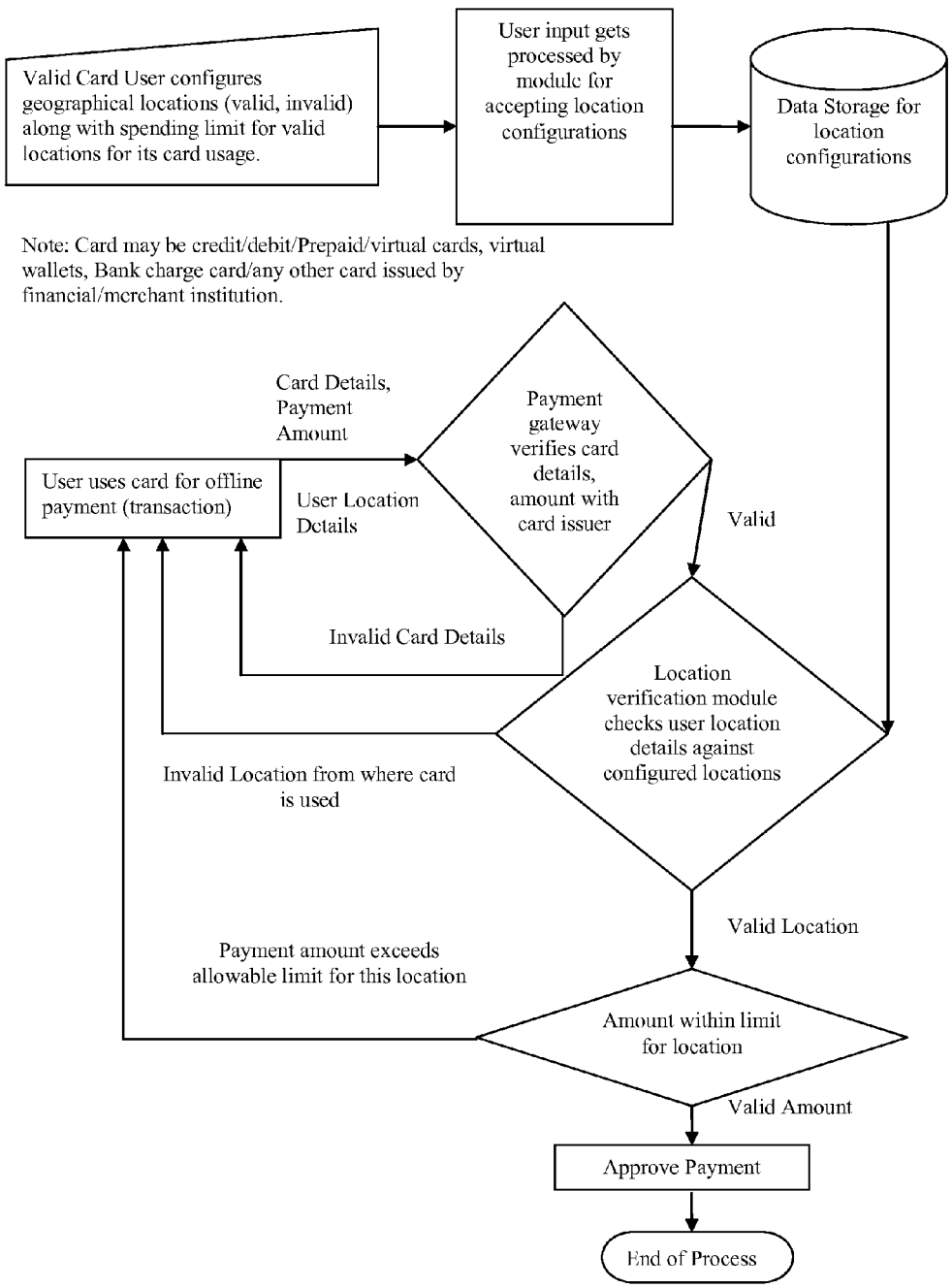

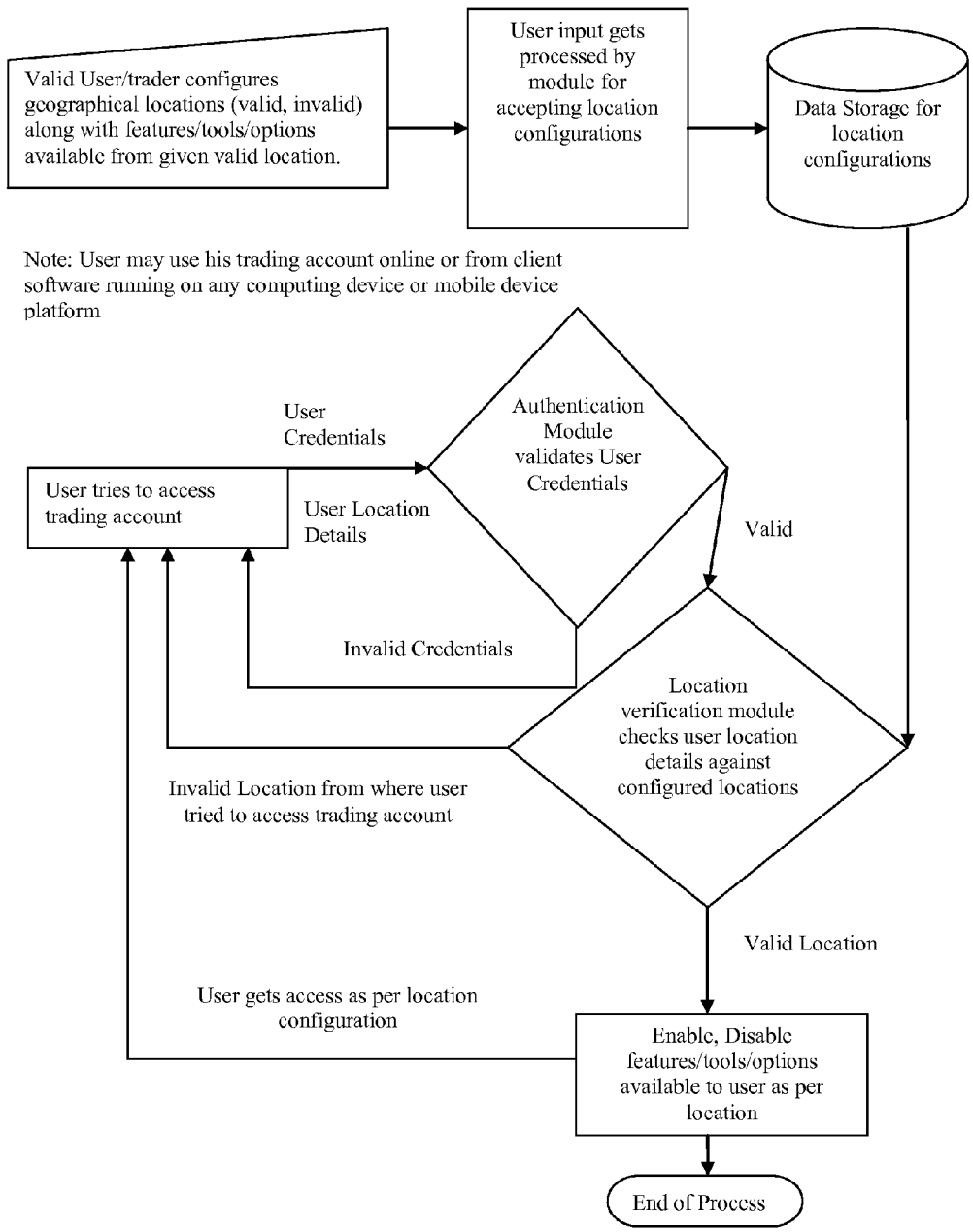
Figure 3: Location based security for trading account

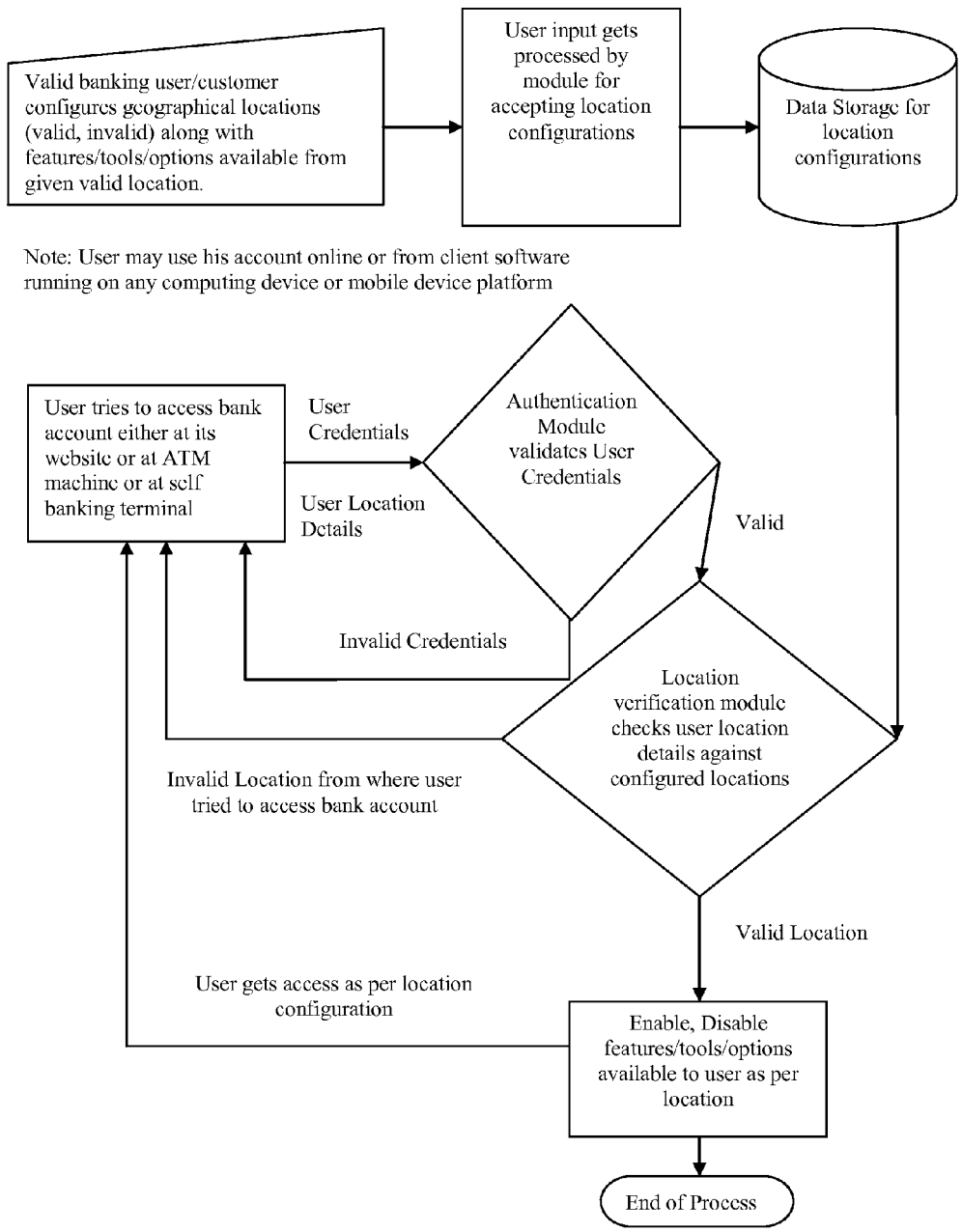
Figure 4: Location based security for bank account

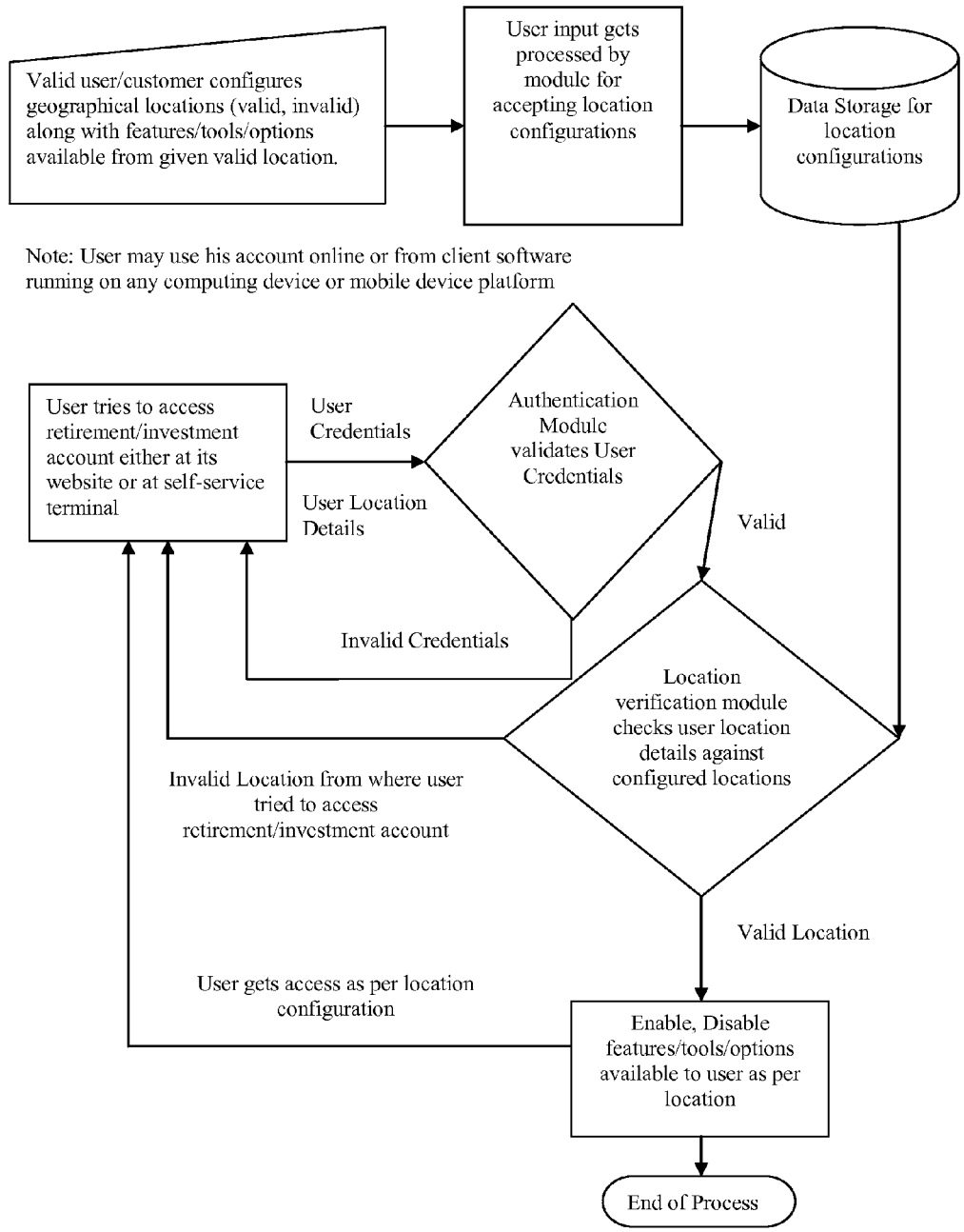
Figure 5: Location based security for retirement/investment account

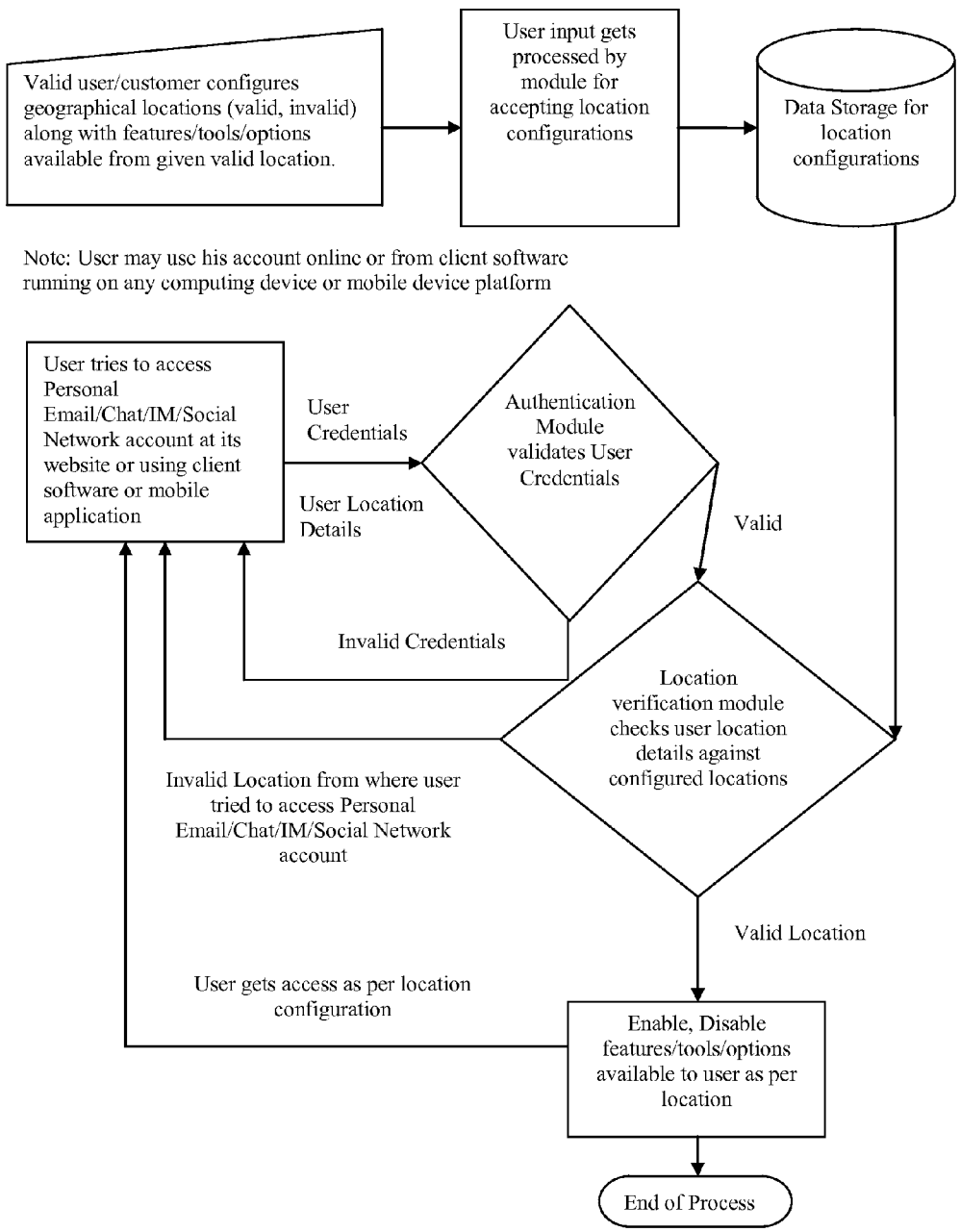
Figure 6: Location based security for Personal Email/Chat/IM/Social Network account services/features

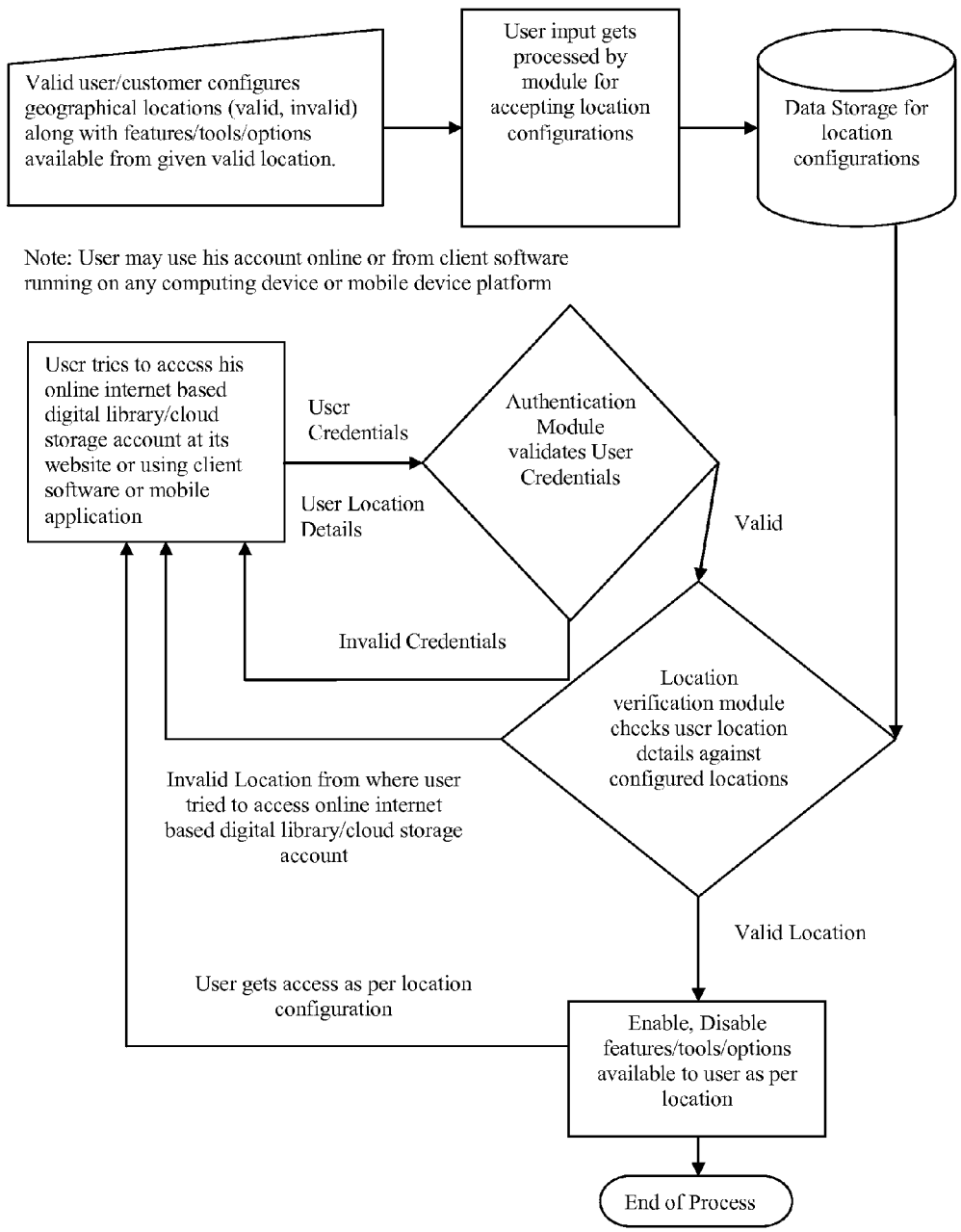
Figure 7: Location based security for user account for online internet based digital library/network based cloud storage

METHOD FOR PROVIDING GEOGRAPHICAL LOCATION-BASED SECURITY, RESTRICT, PERMIT ACCESS OF VARYING LEVEL TO INDIVIDUAL'S ANY KIND OF DATA, INFORMATION, CREDIT, FINANCES, SERVICES OBTAINED(ONLINE AND OR OFFLINE)

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM, LISTING COMPACT DISC APPENDIX

Not Applicable

BACKGROUND OF THE INVENTION

The proposed invention concerns security. In particular proposed method is to provide/improve/strengthen security for individual's any kind of data, information, credit, finances, services obtained (online and or offline) using geographical location.

Most common method of security implementation to restrict, permit access of varying level to individual's any kind of data, information, credit, finances, services obtained (online and or offline) is by asking user to present his/her credentials based on user identification string and password/token. There are many well known instances of user credential data, personal data, communication account related data (email ids and passwords of users of email system), financial data, payment transaction data (e.g. credit card data) getting stolen err masse or targeted to specific individuals. This method has drawback of getting credentials misused by hacker or any other unauthorized user to gain access on behalf of authorized user. Also with recent cases of digital certificates getting stolen from certificate providers it is also not fail safe. Current method allows anywhere access in most of the cases while user may not want to have such access in exchange of getting extra security. Proposed invention puts control in hands of individual user for securing his/her data, information, credit, finances, services obtained (online and or offline).

BRIEF SUMMARY OF THE INVENTION

The proposed method in invention improves the security of individual user's any kind of data, information, credit, finances, services obtained (online and or offline).

It also reduces fear of hacking/stealing one's credentials and getting misused.

The proposed method may do so by determining and using user's current geographical location information such as longitude, latitude, IP address or any other way of identifying location and comparing against location boundary, area, physical location address configured by individual user as a locations configured for varying levels of access.

BRIEF DESCRIPTION OF THE SEVERAL VIEWS OF THE DRAWING

FIG. 1: Location based security for online payments (transactions)
FIG. 2: Location based security for offline payments (transactions)
FIG. 3: Location based security for trading account
FIG. 4: Location based security for bank account
FIG. 5: Location based security for retirement/investment account
FIG. 6: Location based security for Personal Email/Chat/IM/Social Network account
FIG. 7: Location based security for user account for online internet based digital library/network based cloud storage

DETAILED DESCRIPTION OF THE INVENTION

Definition

"Geographical location" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, one or more geographic areas defined by some other means, etc. It may include latitude and/or longitude, or a range thereof. Thus, for example, it may be or include an area defined by a geographic reference point and perhaps some additional information, such as a circular area of a defined radius about a point defined by latitude and longitude coordinates for example. As another example, it may be an area defined by three or more geographic reference points, such as a triangle, rectangle, pentagon, or some other polygon defined by a number of geographic reference points for example. It may include information, such as an IP address, from which a user location can be estimated.

Proposed Method:

To largely reduce the threat and possibility of unauthorized use of hacked/stolen credentials we propose location based security where locations are configured by person interested to protect his/her data, content, information, credit, finances, financial assets, financial resources, services obtained (online or offline) based on his/her normal usage needs. So now even if user credentials get stolen there would be limited possibility/window to misuse it.

Under this new proposed method user would define one or more geographical location boundaries or location(s) either by means of series of pairs of longitude latitude combinations or specifying address or location name (for e.g. 'Times Square, New York city', 'Middlesex county, NJ', 'Main Street, Old bridge NJ' etc) or using some GUI tool to draw the location area on map.

For each of these defined locations he would configure access of varying levels. This method can be used to provide/strengthen security for individual's any kind of data, information, credit, finances, services obtained (online and or offline).

Examples of Usage of Proposed Method:

Security system made using proposed method, allows user to restrict/allow/limit usage of his bank charge cards (credit/debit or any other), prepaid cards, virtual cards, virtual wallets, any card with monetary balance for online payments or transactions from one or more geographical locations that are configured by him. For e.g. John Smith wants to use his credit card with overall credit limit $10000 for online payments from home area ('Main street, Old Bridge, N.J.'), office area (located at 'times square, New York city') using computing devices like PC or laptop or any other or using wireless devices and mobile payment platforms or any other means. He wants this access from within say 2 mile radius from given location's centre. He doesn't want to allow his credit card to be utilized from any other location for online shopping. Also he wants to further security by limiting amount of invoice during online payment to $1000 maximum if credit card used from 'times square, NYC' area. Based on this requirement, when ever John does online payment, our system will check his credit card details and current geographical location against locations configured in system by John himself. When card details are valid, amount is approvable and location match found, amount within location limit set if any, payment is allowed to succeed. Now even if John Smith's credit card details get stolen anyhow, hacker must have to use it from locations configured by John Smith to be able to use it. So hacker would not be able to use it from any random location and if used from within 2 miles radius of John's time square location then he would get limited access—cannot use for amount more than $1000. Also if John Smith comes to know that his card/card details are stolen he can immediately reduce spending limit and or reduce radius and or cut down on locations allowed.

Security system made using proposed method, allows user to restrict/allow/limit usage of his bank charge cards (credit/debit or any other), prepaid cards, virtual cards, virtual wallets, any card with monetary balance for offline payments, withdrawals or transactions from one or more geographical locations that are configured by him. For e.g. John Smith wants to use his credit card with overall credit limit $10000 for offline payments from home area (Main street, Old Bridge, N.J.), office area (located at times square, New York city) using computing devices like PC or laptop or any other or using wireless devices and mobile payment platforms or any other means. He wants this access from within say 2 mile radius from office location's centre and 50 miles radius from home location's centre. He doesn't want to allow his credit card to be utilized from any other location for offline shopping. Also he wants to further security by limiting amount of invoice during offline payment to $500 maximum if credit card used from times square, NYC area. Based on this requirement, when ever John does offline payment, our system will help validate current geographical location of recipient/payment accepting merchant terminal (for e.g. POS terminal) to which payment is made against locations configured in system by John himself. Merchant terminal will transmit card details, amount details and its own location details to payment gateway which will handle card details and amount validation with help of card issuer and use our system to validate location. When card details are valid, amount is approvable and location match found, amount within location limit set if any, payment is allowed to succeed. Now even if John Smith's credit card/credit card details get stolen anyhow, hacker must have to use it from locations configured by John Smith to be able to use it. So hacker would not be able to use it from any random location and if used from within 2 miles radius of John's time square location then he would get limited access cannot use for amount more than $500. Also if John Smith comes to know that his card/card details are stolen he can immediately reduce spending limit and or reduce radius and or cut down on locations allowed.

Security system made using proposed method, allows user to restrict/allow/limit usage of his trading account from one or more geographical locations that are configured by him. For e.g. John Smith wants to do account maintenance tasks such as link bank accounts, deposit/withdraw money to/from his trading account from/to bank account or withdraw funds using wire transfer from home area (Main street, Old Bridge, N.J.) only, and do actual trades from home as well as office area (located at times square, New York city) using computing devices like PC or laptop or any other or using wireless devices and mobile payment platforms or any other means. He wants this access from within say 2 mile radius from office location's centre and 5 miles radius from home location's centre as well as the route that he is using to commute to office. He doesn't want to allow his trading account to be accessed from any other location. Based on this requirement, when ever John accesses his trading account our system will check his credentials and current geographical location against locations configured in system by John himself. When match found account features are enabled or disabled as per location. Now even if John Smith's trading account details get stolen anyhow, hacker must have to use it from locations configured by John Smith to be able to use ft. So hacker would not be able to access account from any random location and if tried from within 2 miles radius of John's time square location then he would get limited access. Also if John Smith comes to know that his trading account details are stolen he can immediately change it and or reduce radius and or cut down on locations allowed.

Security system made using proposed method, allows user to restrict/allow/limit usage of his bank account from one or more geographical locations that are configured by him. For e.g. John Smith wants to do account maintenance tasks such as link bank accounts, do bill payments, do internal or external account transfers to/from his bank account, withdrawals from home area (Main street, Old Bridge, N.J.) only, and review account balances, bank transaction history or view pending transactions from home as well as office area (located at times square, New York city) using computing devices like PC or laptop or any other or using wireless devices and mobile payment platforms or any other means. He wants this access from within say 2 mile radius from office location's centre and 5 miles radius from home location's centre as well as the route that he is using to commute to office. He doesn't want to allow his bank account to be accessed from any other location. Based on this requirement, when ever John accesses his bank account our system will check his credentials and current geographical location against locations configured in system by John himself. When match found account features are enabled or disabled as per location. Now even if John Smith's bank account details get stolen anyhow, hacker must have to use it from locations configured by John Smith to be able to use it. So hacker would not be able to access account from any random location and if tried from within 2 miles radius of John's time square location then he would get limited access. Also if John Smith comes to know that his bank account details are stolen he can immediately change it and or reduce radius and or cut down on locations allowed.

Security system made using proposed method, allows user to restrict/allow/limit usage of his retirement/investment account from one or more geographical locations that are configured by him. For e.g. John Smith wants to do account maintenance tasks such as link retirement/investment account with bank accounts, change plans, do internal or external account transfers to/from his retirement/investment account from home area (Main street, Old Bridge, N.J.) only, and review account balances, account history or view pending transactions from home as well as office area (located at times square, New York city) using computing devices like PC or laptop or any other or using wireless devices and mobile payment platforms or any other means of access. He wants this access from within say 2 mile radius from office location's centre and 5 miles radius from home location's centre as well as the route that he is using to commute to office. He doesn't want to allow his retirement/investment account to be accessed from any other location. Based on this requirement, when ever John accesses his retirement/investment account our system will check his credentials and current geographical location against locations configured in system by himself. When match found account features are enabled or disabled as per location. Now even if John Smith's retirement/investment account details get stolen anyhow, hacker must have to use it from locations configured by John Smith to be able to use it. So hacker would not be able to access account from any random location and if tried from within 2 miles radius of John's time square location then he would get limited access. Also if John Smith comes to know that his retirement account details are stolen he can immediately change it and or reduce radius and or cut down on locations allowed.

Security system made using proposed method, allows user to restrict/allow/limit usage of his Personal Email/Chat/IM/Social Network Account services/features from one or more geographical locations that are configured by him. For e.g. John Smith wants to do account maintenance tasks such as set rules/filters, set email archival policy, change out of office greeting, manage folders, delete old emails/messages, manage contacts, add friends, change server account connection details, from home area (Main street, Old Bridge, N.J.) only, and use it to compose, send receive emails, read, send messages, set status messages, from home area as well as office area, (located at times square, New York city) using computing devices like PC or laptop or any other or using wireless devices or any other means of communication. He wants this access from within say 2 mile radius from office location's centre and 5 miles radius from home location's centre as well as the route that he is using to commute to office. He doesn't want to allow his email/chat/IM/Social Network account to be accessed from any other location. Based on this requirement, when ever John accesses his account our system will check his credentials and current geographical location against locations configured in system by John himself. When match found account features are enabled or disabled as per location. Now even if John Smith's communication account details get stolen anyhow, hacker must have to use it from locations configured by John Smith to be able to use it. So hacker would not be able to access account from any random location and if tried from within 2 miles radius of John's time square location then he would get limited access. Also if John Smith comes to know that his communication account details are stolen he can immediately change it and or reduce radius and or cut down on locations allowed.

Security system made using proposed method, allows user to restrict/allow/limit access and management of his digital files stored in internet based digital library/network based cloud storage system service from one or more geographical locations that are configured by him. For e.g. John Smith wants to do maintenance tasks such as purge older data, upload new data, create new data, manage folders, change security settings, connection details, from home area (Main street, Old Bridge, N.J.) only, and have read only access from home area as well as office area, (located at times square, New York city) using computing devices like PC or laptop or any other or using wireless devices or any other means of communication. He wants this access from within say 2 mile radius from office location's centre and 5 miles radius from home location's centre as well as the route that he is using to commute to office. He doesn't want to allow his data files to be accessed from any other location. Based on this requirement, when ever John accesses his medium our system will check his credentials and current geographical location against locations configured in system by John himself. When match found access given would be as per location. Now even if John Smith's credential details to access his files get stolen anyhow, hacker must have to use it from locations configured by John Smith to be able to use it. So hacker would not be able to access his flies from any random location and if tried from within 2 miles radius of John's time square location then he would get limited access. Also if John Smith comes to know that his credential details are stolen he can immediately change it and or reduce radius and or cut down on locations allowed.

We claim:

1. A method of providing geographical location based security for access, usage, management of user's entities comprising:

protecting entities owned by the user by configuring geographical locations and geographical boundaries, permissions and access levels, security alerts using computing devices or using wireless devices;

select one or more entities associated with the user for opting for location based security;

configure one or more geographical locations by inputting zipcode, city name, county name, state name, country name, geographical boundaries by inputting series of geographical reference points covering certain area, area described by geographical reference point with radius;

assign relevant permissions and access level for each of the geographical locations, boundaries and reference points, for ability to access, use, and manage the user entities;

configure the security alerts and alert receiving devices; and processing mechanism logic in form of executable code executable on an application server using the configurations for denying or approving as per access level authorization requests coming over network from computational devices, wireless devices or communication devices and sending out alerts to user's alert devices if alert conditions are met; and wherein alert condition configured by the user includes:
rejection of access request;
distance between two subsequent access request's geographical reference point is more than x meters, where x is the threshold distance configured by the user; and
access request originating from not configured geographic location.

2. The method as per claim 1 wherein the authorization requests coming over the network comprising:
defining entity belonging to user,
action sought to be approved includes 'access', 'use', 'level of access or use requested' and 'manage entity', and
user's current geographical location determined either by physical addresses of Point Of Sale terminals, merchant terminals, banking machines, self-serving terminals, longitude, latitude coordinates determined from information provided by user's computational device or wireless device that he is using, IP address of device from where access is requested or information provided by mobile payment platform.

3. The method as per claim 1 for providing the geographical location based security wherein entities owned by the user includes his monetary resource including credit account's credit line, monetary assets like checking, saving, instrument of monetary value that is attributed to the user.

4. The method as per claim 1 for providing the geographical location based security, where
entities owned by the user include financial transaction accounts that includes bank account, trading account for Investment accounts that user has access to.

5. The method as per claim 1 for providing the geographical location based security where
entities owned by user includes communication and collaboration accounts including Email, Messenger, Chat, and Social network accounts.

6. The method as per claim 1 for providing the geographical location based security, wherein
entities owned by the user includes personal digital data and personal digital files.

7. The method as per claim 1, wherein the authorization request includes requests for:
approving certain amount of purchase using, monetary resource or monetary asset, withdraw certain amount of money, and transferring money;
login to financial accounts, take certain financial actions using financial accounts including withdrawing funds, placing trades, and canceling trades;
login to communication and collaboration accounts, read email, read messages, send email, send messages, purge older messages, create filters, update the status, archive older content, upload content, share content, comment or refer content posted by others, and post content; and
action on personal data and personal digital files including read, create new, update existing, delete, archive, upload, download, export, and send to other location.

8. The method as per claim 1 for providing the geographical location based security, wherein source of the authorization requests coming over the network includes:
physical vendor's Point of sale Terminals' (POS) systems, online transactions processing systems, bank websites, creditor's website, or software program allowing user to spend, use, manage own monetary resources and monetary assets;

web hosted applications or software programs for operating financial transaction accounts including Bank account, investment account, trading account installed on user's computation device, wireless devices or communication device for allowing users to access, use certain functional features including withdrawing funds, and canceling trades;

web hosted applications or programs for Communication, Collaboration or Social Networking installed on user's computation device, wireless device or communication devices for allowing users to access, and use available account features; and web or network hosted application or software programs for storing, managing personal digital data or personal digital files installed on user's computational device, wireless device or communication device for allowing users to access and use available account features.

* * * * *